United States Patent Office 2,797,225
Patented June 25, 1957

---

2,797,225

1,3,4-THIADIAZOLYL-N-ACYLSULFONAMIDES

George W. Anderson, Darien, Conn., assignor to American Cyanamid Company, New York, N. Y., a corporation of Maine No Drawing. Application December 27, 1955,
Serial No. 555,307

4 Claims. (Cl. 260—306.8)

This invention relates to new organic compounds and more particularly is concerned with the preparation of novel 1,3,4-thiadiazolyl-N-acylsulfonamides which may be represented by the following general formula:

wherein R is a thiadiazole radical, which may be either the unsubstituted 1,3,4-thiadiazole radical or the thiadiazole radical may be substituted in a 2-position by an acylamino group such as, for example, acetylamino, a lower alkylamino group, a mononuclear arylamino group, i. e., phenylamino, or a lower alkyl substituted mononuclear arylamino group, i. e., benzylamino; and R'CO may be either an aliphatic acyl radical such as acetyl, butyryl, propionyl, pentanoyl, hexanoyl, etc., or an aroyl radical such as benzoyl, toluyl, phthaloyl or naphthoyl radicals.

The present invention is particularly concerned with the preparation of the $N^5$-acyl compounds since such compounds have not heretofore been described.

The invention also includes the process of preparing the $N^5$-acyl compounds described above. This process may be carried out by reacting the known compound, 2-acetylamino-1,3,4-thiadiazole-5-sulfonamide, for example, with either an alkanoyl or an aroyl chloride at a temperature between about 25° C. and 115° C. in the presence of a suitable basic organic solvent such as pyridine.

The reaction may be illustrated schematically below using n-butyryl chloride as an example of a suitable alkanoyl chloride.

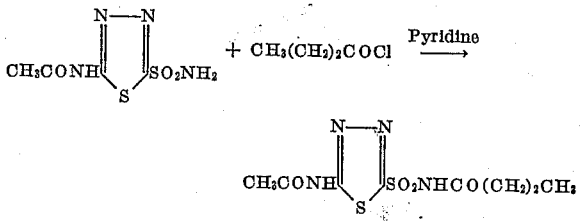

The novel compounds of this invention may be used as curing catalysts for the water-soluble polymeric resins of the amine-aldehyde type, that is aminoplast resins wherein a suitable aldehyde such as formaldehyde, acetaldehyde, etc., is condensed with any substance whose molecule has an NH or an $NH_2$ group, as, for example, a substance whose molecule has a plurality of $NH_2$ groups each connected to a carbon atom contained either in a linear chain or in a ring, which in turn is connected by a double bond to a nitrogen, sulfur or oxygen atom, e. g., urea, thiourea, biuret, maleamide, ethylene diurea, trimethylene diurea, diethylene triurea, biguanide, dicyandiamidine, guanidine, guanazole, 2,4-diamino-6-hydroxypyrimidine, acetoguanamine, benzoguanamine, triamino triazine (i. e. melamine), and the like.

As is known to the art, curing catalysts have the property of changing a fusible thermosetting resinous material to an infusible thermoset resinous material. The resinous compositions are useful in a variety of applications such as molding, laminating, etc.

The compounds described herein may be used in curing the aforementioned aminoplast resins by methods known to the art. Thus, the novel compounds may be added to the fusible monomeric materials in concentrations of 0.1–0.5% and the mass heated at temperatures of 150–170° C. to effect curing of the aminoplast resins.

The invention will be described in greater detail in conjunction with the following specific examples.

*Example 1*

Twenty-two parts of 2-acetylamino-1,3,4-thiadiazole-5-sulfonamide are heated in 50 parts of dry pyridine on a steam bath until dissolved. With stirring and heating, 11.7 parts of n-butyryl chloride are added. The resulting brown solution is heated, then cooled and 250 parts of water are added. The product is precipitated by acidification to pH 2. Recrystallization from 50% alcohol gives colorless crystals of 2-acetylamino-1,3,4-thiadiazolyl-5-N-(n-butyrolyl)sulfonamide having a melting point of 233–234° d.

*Example 2*

The procedure of the preceding example is repeated except that an equivalent quantity of acetyl chloride is used in place of the n-butyryl chloride in Example 1. The product is recrystallized as above to yield 2-acetylamino-1,3,4-thiadiazolyl-5-N-acetylsulfonamide having a melting point at 235–237° d.

*Example 3*

The procedure of the preceding examples is repeated except that an equivalent quantity of benzoyl chloride is used. 2 - acetyl - amino - 1,3,4 - thiadiazolyl - 5 - N - benzoylsulfonamide is produced.

I claim:
1. 1,3,4 - thiadiazolyl - 5 - N - acylsulfonamides of the formula:

wherein R is a 2-lower alkyl carboxylic acylamino 1,3,4-thiadiazole radical and R' is a member of the group consisting of alkanoyl and aroyl radicals.

2. 2 - acetylamino - 1,3,4 - thiadiazolyl - 5 - N - (n-butyrolyl)sulfonamide.

3. 2 - acetylamino - 1,3,4 - thiadiazolyl - 5 - N - acetylsulfonamide.

4. 2 - acetylamino - 1,3,4 - thiadiazolyl - 5 - N - benzolysulfonamide.

References Cited in the file of this patent

UNITED STATES PATENTS

| | | |
|---|---|---|
| 2,554,816 | Clapp et al. | May 29, 1951 |
| 2,721,204 | Vaughan et al. | May 7, 1954 |